(12) United States Patent
Funaki et al.

(10) Patent No.: US 12,371,385 B2
(45) Date of Patent: *Jul. 29, 2025

(54) SLIDING MEMBER, AND BEARING, MOTOR, AND DRIVE DEVICE USING THE SAME

(71) Applicants: KABUSHIKI KAISHA TOSHIBA, Tokyo (JP); TOSHIBA MATERIALS CO., LTD., Yokohama (JP)

(72) Inventors: Kai Funaki, Yokohama Kanagawa (JP); Katsuyuki Aoki, Yokohama Kanagawa (JP); Haruhiko Yamaguti, Yokohama Kanagawa (JP); Minoru Takao, Yokohama Kanagawa (JP); Yutaka Abe, Zushi Kanagawa (JP)

(73) Assignees: KABUSHIKI KAISHA TOSHIBA, Tokyo (JP); TOSHIBA MATERIALS CO., LTD., Yokohama (JP)

( * ) Notice: Subject to any disclaimer, the term of this patent is extended or adjusted under 35 U.S.C. 154(b) by 632 days.

This patent is subject to a terminal disclaimer.

(21) Appl. No.: 17/236,580

(22) Filed: Apr. 21, 2021

(65) Prior Publication Data

US 2021/0261467 A1 Aug. 26, 2021

Related U.S. Application Data

(63) Continuation of application No. PCT/JP2019/045268, filed on Nov. 19, 2019.

(30) Foreign Application Priority Data

Dec. 11, 2018 (JP) ................................. 2018-231856

(51) Int. Cl.
*C04B 35/587* (2006.01)
*C04B 35/593* (2006.01)
(Continued)

(52) U.S. Cl.
CPC .......... *C04B 35/587* (2013.01); *C04B 35/593* (2013.01); *C04B 35/6261* (2013.01);
(Continued)

(58) Field of Classification Search
CPC ........ C04B 35/6261; C04B 2235/3873; C04B 2235/786; C04B 2235/85; F16C 19/02; F16C 33/32; F16C 2206/60
See application file for complete search history.

(56) References Cited

U.S. PATENT DOCUMENTS 11,512,023 B2 * 11/2022 Aoki ..................... C04B 35/587
2002/0010068 A1 1/2002 Komatsu
(Continued)

FOREIGN PATENT DOCUMENTS

CN 1537086 A 10/2004
CN 107531579 A 1/2018
(Continued)

OTHER PUBLICATIONS

WO-2016117553-A1 machine translation (Year: 2016).*
(Continued)

*Primary Examiner* — Bryan D. Ripa
*Assistant Examiner* — Cameron K Miller
(74) *Attorney, Agent, or Firm* — Harness, Dickey & Pierce, P.L.C.

(57) ABSTRACT

The sliding member according to the embodiment includes a silicon nitride sintered body that includes silicon nitride crystal grains and a grain boundary phase, in which a percentage of a number of the silicon nitride crystal grains including dislocation defect portions inside the silicon nitride crystal grains among any 50 of the silicon nitride crystal grains having completely visible contours in a 50 μm×50 μm observation region of any cross section or surface of the silicon nitride sintered body is not less than
(Continued)

0% and not more than 10%. The percentage is more preferably not less than 0% and not more than 3%.

16 Claims, 2 Drawing Sheets

(51) Int. Cl.
- *C04B 35/626* (2006.01)
- *C04B 35/63* (2006.01)
- *C04B 35/645* (2006.01)
- *F16C 19/02* (2006.01)
- *F16C 33/32* (2006.01)
- *H02K 5/173* (2006.01)
- *H02K 7/08* (2006.01)
- *H02K 11/33* (2016.01)

(52) U.S. Cl.
CPC .......... *C04B 35/63* (2013.01); *C04B 35/6455* (2013.01); *F16C 19/02* (2013.01); *F16C 33/32* (2013.01); *H02K 5/1732* (2013.01); *H02K 7/083* (2013.01); *H02K 11/33* (2016.01); *C04B 2235/3217* (2013.01); *C04B 2235/3222* (2013.01); *C04B 2235/3225* (2013.01); *C04B 2235/3232* (2013.01); *C04B 2235/3244* (2013.01); *C04B 2235/3826* (2013.01); *C04B 2235/3839* (2013.01); *C04B 2235/3865* (2013.01); *C04B 2235/3873* (2013.01); *C04B 2235/5436* (2013.01); *C04B 2235/661* (2013.01); *C04B 2235/782* (2013.01); *C04B 2235/786* (2013.01); *C04B 2235/85* (2013.01); *F16C 2206/60* (2013.01)

(56) References Cited

U.S. PATENT DOCUMENTS

| | | |
|---|---|---|
| 2004/0191535 A1 | 9/2004 | Komatsu |
| 2010/0054652 A1 | 3/2010 | Takao et al. |
| 2011/0039068 A1 | 2/2011 | Takao |
| 2018/0002237 A1* | 1/2018 | Aoki ................... C04B 35/584 |
| 2018/0134626 A1 | 5/2018 | Ikeda et al. |

FOREIGN PATENT DOCUMENTS

| | | |
|---|---|---|
| DE | 10136499 A1 | 2/2003 |
| EP | 3846596 A1 | 7/2021 |
| JP | 2000-169239 A | 6/2000 |
| JP | 2003-063872 A | 3/2003 |
| JP | 2011-72113 A | 4/2011 |
| JP | 2011-132126 A | 7/2011 |
| JP | 5380277 B2 | 1/2014 |
| JP | 2016-064971 A | 4/2016 |
| WO | WO-2009128386 A1 | 10/2009 |
| WO | WO-2016117553 A1 * | 7/2016 ........... C04B 35/584 |

OTHER PUBLICATIONS

S. Murata, Handbook of Applied Physics, Maruzen Co., Ltd., published Apr. 25, 2002 right col. of p. 219 (with English machine translation).

Chinese Decision to Grant Patent—issued May 8, 2024 in counterpart Chinese Application No. 202310221657.X (English translation attached).

\* cited by examiner

SLIDING MEMBER, AND BEARING, MOTOR, AND DRIVE DEVICE USING THE SAME

CROSS-REFERENCE TO RELATED APPLICATIONS

This is a continuation application of International Patent Application No. PCT/JP2019/045268, filed on Nov. 19, 2019. This application also claims priority to Japanese Patent Application No. 2018-231856, filed on Dec. 11, 2018. The entire contents of which are incorporated herein by reference.

FIELD

Embodiments relate to a sliding member, and a bearing, a motor, and a drive device using the same.

BACKGROUND

A wear-resistant sliding member that includes a silicon nitride sintered body is used in various fields such as various roll materials for rolling, engine parts such as cam rollers, bearing members, compressor vanes, gas turbine blades, friction stir welding tool members, etc. These are used as members that slide with respect to mating members. It is desirable for the silicon nitride sintered body to be strong and wear-resistant.

For example, a silicon nitride sintered body in which the silicon nitride crystal grain size and the void size are controlled is discussed in Japanese Patent No. 5380277 (Patent Literature 1). The silicon nitride sintered body of Patent Literature 1 can improve both the strength and the wear resistance. In Patent Literature 1, a rolling life that is not less than 600 hours is obtained thereby.

In recent years, electric vehicles are becoming widespread. Inverter driving is becoming mainstream for motors mounted in electric vehicles. In an inverter driving technique, the rotational speed of the motor can be changed by changing the frequency of the power supply driving the motor. That is, in an inverter driving technique, the rotational speed of the motor can be changed. Inverter-driven motors are becoming widespread in diverse fields such as electric vehicles, industrial devices, etc.

By employing inverter driving, it is possible to change the rotational speed of the motor from 1000 rpm to a maximum speed of about 15000 rpm.

DETAILED DESCRIPTION

Figure 1:
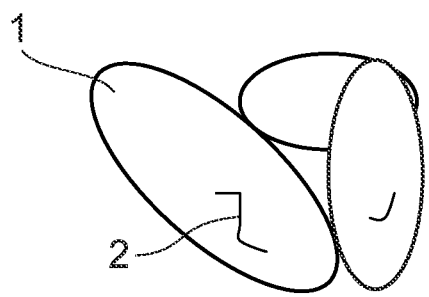
FIG. 1 is a conceptual view illustrating silicon nitride crystal grains that include dislocation defect portions.

The sliding member according to the embodiment includes a silicon nitride sintered body that includes silicon nitride crystal grains and a grain boundary phase, in which a percentage of a number of the silicon nitride crystal grains including dislocation defect portions inside the silicon nitride crystal grains among any 50 of the silicon nitride crystal grains having completely visible contours in a 50 μm×50 μm observation region of any cross section or surface of the silicon nitride sintered body is not less than 0% and not more than 10%.

The sliding member according to the embodiment reduces the percentage of the silicon nitride crystal grains including dislocation defect portions. Thereby, excellent durability can be obtained even if the sliding conditions change such as the rotational speed changing, etc. Also, the occurrence of electrolytic corrosion can be suppressed.

The silicon nitride sintered body includes silicon nitride crystal grains and a grain boundary phase. The grain boundary phase mainly includes the component of a sintering aid. The grain boundary phase is formed by a reaction of the sintering aid in the sintering process. The reaction occurs between the sintering aids, between the sintering aid and the silicon nitride, or between the sintering aid and impurity oxygen.

In a sliding member according to an embodiment, a percentage of a number of the silicon nitride crystal grains including dislocation defect portions inside the silicon nitride crystal grains among any 50 of the silicon nitride crystal grains having completely visible contours in a 50 μm×50 μm observation region of any cross section or surface is not less than 0% and not more than 10%.

Any cross section or surface of the silicon nitride sintered body is used to observe the dislocation defects.

First, any cross section or surface of the silicon nitride sintered body is made by ion milling or FIB (focused-ion beam) processing so that the surface roughness Ra is not more than 1 μm. The cross section or the surface that is made is used as the evaluation surface.

Then, the evaluation surface is observed using a transmission electron microscope (TEM). The magnification in the evaluation by TEM is set to be not less than 10000 times. The surface area of the evaluation surface is set to 50 μm×50 μm. The evaluation surface may be observed by dividing the evaluation surface into a plurality when a 50 μm×50 μm region cannot be observed in one field. For example, a field of 10 μm×10 μm or less may be observed. In the evaluation, after observing one observation region (50 μm×50 μm), another region that is separated from the region by not less than 1000 μm is observed. That is, the percentage of the number of the silicon nitride crystal grains (the defective grains) including dislocation defect portions is calculated by observing 50 μm×50 μm regions in not less than two locations.

The existence or absence of dislocation defect portions is discriminated by observing the dark field and the bright field of the TEM observation image. The dislocation defect portion appears white in the dark field, and is inverted and appears black in the bright field. Thus, a section where the pixel color inverts when switching between the dark field and the bright field is taken to be a dislocation defect portion.

FIG. 1 is a conceptual view illustrating silicon nitride crystal grains that include dislocation defect portions. In FIG. 1, 1 is a silicon nitride crystal grain. 2 is a dislocation defect portion. In the silicon nitride sintered body of the sliding member according to the embodiment as shown in FIG. 1, the dislocation defect portion 2 may exist inside the silicon nitride crystal grain 1.

Durability degrades when the sliding conditions change if there are dislocation defect portions inside the silicon nitride crystal grains. The dislocation defect portion is a crystal defect included in the crystal. The crystal defect is also called a lattice defect (Lattice Defect). The crystal defect occurs due to an impurity or a disturbance of the atomic arrangement. The dislocation defect portion causes a defect to occur in a stable crystal structure.

For example, the rotational speed of a motor for which inverter driving is used changes in a range of about 0 rpm to 15000 rpm. A rotational speed of 0 rpm is a state in which the motor is stopped. A motor that is inverter-driven can be driven while changing the rotational speed to be about 50 to 15000 rpm. Accordingly, the load on the bearing balls used in the bearing of the motor also changes. It was found that the dislocation defect portions affect the decrease of the durability when a strong load such as that of a bearing ball is applied to the silicon nitride sintered body.

The silicon nitride sintered body is a material that has high strength and high wear resistance. There is no problem when the surface of the sliding member slides with respect to the mating member at a constant rotational speed as in Patent Literature 1. However, it was found that the long-term life of the sliding member is affected when the sliding member slides while the application conditions of the load change.

The vibration frequency of the motor changes according to the rotational speed. That is, when the rotational speed changes, the vibration frequency also changes. The vibration of the motor causes a vibration of the bearing. The bearing causes resonance at a designated vibration frequency. Resonance is the phenomenon in which the width of the vibration becomes large when a vibration that is equal to the natural frequency is applied to the vibrating body from the outside.

Resonance occurs when the vibration frequency of the bearing is near the natural frequency of the bearing. The load on the rolling body (the bearing ball) becomes large under resonance. The vibration frequency changes in an inverter-driven motor.

The load of the rolling body becomes large when the vibration frequency changes and passes through the vibration frequency band at which the resonance of the bearing occurs. Thus, the sliding conditions change when the rotational speed changes.

As described above, the dislocation defect portion is a crystal defect. Problems do not occur when the load applied to the silicon nitride sintered body is small, but effects arise when the load applied to the silicon nitride sintered body is large.

This is because the way that stress is borne is different between a silicon nitride sintered body that includes dislocation defect portions and a silicon nitride sintered body that does not include dislocation defect portions.

In the silicon nitride sintered body of the sliding member according to the embodiment, the percentage of the number of the silicon nitride crystal grains including dislocation defect portions is not less than 0% and not more than 10% in any 50 μm×50 μm micro region. The percentage in any 50 μm×50 μm observation region being not less than 0% and not more than 10% means that the percentage of the number is not less than 0% and not more than 10% regardless of where the 50 μm×50 μm region is observed.

Electrolytic corrosion easily occurs when the percentage of the number of the silicon nitride crystal grains including dislocation defect portions is greater than 10%. When the bearing is disposed proximate to an inverter-driven device or a device generating a high frequency, a current flows inside the bearing due to the effects of electromagnetic noise. A phenomenon of the raceway surface of the bearing being damaged by this current is called electrolytic corrosion. Although the interior of the bearing is insulated by grease, etc., a discharge phenomenon occurs when the current exceeds a constant amount.

The dislocation defect portion of the silicon nitride crystal grain is a crystal defect. It is considered that the crystal defect portion easily becomes a discharge path because a potential difference easily occurs in the crystal defect portion.

When the percentage of the number of the silicon nitride crystal grains including dislocation defect portions is greater than 10%, the dislocation defect portions become discharge paths in the silicon nitride sintered body; as a result, electrolytic corrosion easily occurs at the raceway surface of the bearing.

Generally, grease is filled into the bearing interior (between the inner ring and the outer ring). The grease can improve the lubrication, heat resistance, waterfastness, etc., of the bearing. A voltage is generated along the rotation axis when inverter driving of the motor is performed. Electrolytic corrosion occurs because the voltage causes dielectric breakdown of the grease in the bearing interior. The silicon nitride sintered body is an insulating body and has a volume resistance value that is not less than $1 \times 10^{14}$ Ω·cm at room temperature. The insulating body is polarized when an electric field is applied. In inverter driving, the rotational speed can be changed by changing the frequency. To this end, an alternating current electric field is generated in the inverter. The dislocation defect portion includes a defect. Therefore, an electric field difference due to the polarization phenomenon easily occurs. In the sliding member according to the embodiment, the occurrence of the electric field difference can be suppressed because the dislocation defect portions are few.

Therefore, it is favorable for the percentage of the number of the silicon nitride crystal grains including dislocation defect portions in the interiors among the silicon nitride crystal grains existing in a 50 μm×50 μm observation region to be not less than 0% and not more than 10%, and more favorably not less than 0% and not more than 3%. Most favorably, the percentage is 0%. That is, the effects of durability improvement and electrolytic corrosion suppression can be increased by having no silicon nitride crystal grains that include dislocation defect portions. Regions at not less than two locations separated from each other by not less than 1000 μm are used as the observed object. Also, a silicon nitride crystal grain that has a contour that is not completely visible in the TEM photograph of at least a portion of the 50 μm×50 μm observation region is not used to calculate the percentage of the number. For example, a silicon nitride crystal grain that has a contour that is partially cut off at the edge of the photograph is not used to calculate the percentage of the number. Also, when 50 silicon nitride crystal grains that have completely visible contours can be confirmed, the percentage of the number of the silicon nitride crystal grains that include dislocation defect portions among the 50 silicon nitride crystal grains is determined. That is, the observation is performed until 50 silicon nitride crystal grains that have completely visible contours can be confirmed. When 50 silicon nitride crystal grains that have completely visible contours cannot be observed in one 50 μm×50 μm observation region, 50 silicon nitride crystal grains that have completely visible contours are observed in another 50 μm×50 μm observation region. When more than 50 silicon nitride crystal grains are visible in the 50 μm×50 μm observation region, any 50 silicon nitride crystal grains are selected. Also, the magnification of the TEM observation of the individual silicon nitride crystal grains is set to 10000 times. When one silicon nitride crystal grain does not fit within one image, the one image may be imaged by dividing into a plurality. In the silicon nitride sintered body of the sliding member according to the embodiment, the percentage of the number of the silicon nitride crystal grains that include dislocation defect portions among any 50 of the silicon nitride crystal grains is not less than 0% and not more than 10%. This means that when more than 50 silicon nitride crystal grains are visible in the 50 μm×50 μm observation region, the percentage of the number of the silicon nitride crystal grains that include dislocation defect portions is not less than 0% and not more than 10% regardless of which of the 50 silicon nitride crystal grains are selected.

Also, it is favorable for no aggregate of a component other than silicon, oxygen, and nitrogen to be 1 μm2 or more in the dislocation defect portion. Also, it is favorable for no component other than silicon, oxygen, and nitrogen to be detected to be 10 mol % or more in the dislocation defect portion.

The component other than silicon, oxygen, and nitrogen is a component that includes a grain boundary phase. The grain boundary phase mainly includes a sintering aid. Therefore, the component other than silicon, oxygen, and nitrogen corresponds to a metal component of the sintering aid. For example, when yttrium oxide (Y2O3) is used as the sintering aid, the component other than silicon, oxygen, and nitrogen is yttrium (Y).

Also, no aggregate of a component other than silicon, oxygen, and nitrogen being 1 μm2 or more means that the metal components included in the grain boundary phase are less than 1 μm2 (including 0 μm2) in the dislocation defect portion. Also, even when multiple sintering aids are used, it is favorable for no aggregate of a component other than silicon, oxygen, and nitrogen to be 1 μm2 or more. This means that a sintering aid component is not a kernel of the dislocation defect portion.

Also, no component other than silicon, oxygen, and nitrogen being detected to be 10 mol % or more means that the metal components of the sintering aid in the dislocation defect portion are less than 10 mol % (including 0 mol %). For example, when yttrium oxide (Y2O3) is used as the sintering aid, this means that yttrium (Y) is less than 10 mol % (including 0 mol %) in the dislocation defect portion. Also, when multiple sintering aids are used, it is favorable for the total of the metal components of the sintering aid to be less than 10 mol %. This means that the sintering aid component is not a kernel of the dislocation defect portion.

Also, it is favorable for the metal components included in the grain boundary phase to be less than 1 μm2 (including 0 μm2) and less than 10 mol % (including 0 mol %) in the dislocation defect portion.

The durability for electrolytic corrosion is improved by no sintering aid component being a kernel of the dislocation defect portion. Also, heat is generated when the discharge phenomenon that causes electrolytic corrosion occurs. Because the sintering aid component forms a low melting-point compound, the sintering aid component easily causes internal breakdown of the silicon nitride crystal grain. Therefore, it is favorable for the sintering aid component not to be a kernel of the dislocation defect portion.

The analysis of the size and concentration of the component other than silicon, oxygen, and nitrogen in the dislocation defect portion is performed by EDX (energy dispersive X-ray analysis) or WDS (wavelength dispersive X-ray analysis). The analysis may be performed in combination with EPMA (an electron probe microanalyzer).

Also, it is favorable for the percentage of the number of the silicon nitride crystal grains in which the occupied area ratio of the dislocation defect portion is not more than 5% among the number of the silicon nitride crystal grains including dislocation defect portions to be not less than 70%. As described above, electrolytic corrosion is not caused if the number of the silicon nitride crystal grains including dislocation defect portions is low. On the other hand, there is a risk that the mechanical durability may degrade if there is a large dislocation defect portion inside one silicon nitride crystal grain. Therefore, it is favorable for the occupied area ratio of the dislocation defect portion inside one silicon nitride crystal grain to be not more than 5%. Also, the effects of durability improvement and electrolytic corrosion suppression can be increased if the percentage of the number of the silicon nitride crystal grains in which the occupied area ratio of the dislocation defect portion is not more than 5% among the number of the silicon nitride crystal grains including dislocation defect portions is not less than 70%. This percentage also is determined in a 50 μm×50 μm observation region.

That is, initially, any 50 of the silicon nitride crystal grains that have completely visible contours in one 50 μm×50 μm observation region are observed. Then, it is confirmed whether or not a dislocation defect portion exists in each of the 50 observed silicon nitride crystal grains. The percentage of the number of the silicon nitride crystal grains that include dislocation defect portions among the 50 observed silicon nitride crystal grains is calculated. It is favorable for the percentage to be not less than 0% and not more than 10%. Continuing, when silicon nitride crystal grains that include dislocation defect portions exist, the occupied area ratio of the dislocation defect portion is calculated for each of the silicon nitride crystal grains. The percentage of the number of the silicon nitride crystal grains in which the occupied area ratio of the dislocation defect portion is not more than 5% among the number of the silicon nitride crystal grains that include dislocation defect portions is calculated. It is favorable for the percentage to be not less than 70%. When there are not 50 silicon nitride crystal grains having completely visible contours in one 50 μm×50 μm observation region, 50 silicon nitride crystal grains that have completely visible contours are searched in another 50 μm×50 μm observation region. After measuring the percentage of the number of the silicon nitride crystal grains that include dislocation defect portions, the occupied area ratio of the dislocation defect portion, etc., in the 50 μm×50 μm observation region, another 50 μm×50 μm observation region that is separated from the observation region by not less than 1000 μm is observed. In the silicon nitride sintered body of the sliding member according to the embodiment, the percentage of the number of the silicon nitride crystal grains that include dislocation defect portions is not less than 0% and not more than 10% for any 50 μm×50 μm observation region of any cross section. Also, the percentage of the number of the silicon nitride crystal grains in which the occupied area ratio of the dislocation defect portion is not more than 5% is not less than 70%. In other words, the size of the dislocation defect portion of the silicon nitride crystal grain is controlled even in a 50 μm×50 μm micro region.

Also, the dark-field image of the TEM photograph described above is used to measure the occupied area ratio of the dislocation defect portion inside one silicon nitride crystal grain. The dislocation defect portion is observed to be white in the dark-field image. In one silicon nitride crystal grain observed in the dark-field image, the total of the surface area of the region that appears white and the surface area of the region that appears black is used as the surface area of the silicon nitride crystal grain. The surface area of the region that appears white in the dark-field image is used as the surface area of the dislocation defect portion. (Dislocation defect portion surface area/silicon nitride crystal grain surface area)×100 (%) is used as the occupied area ratio of the dislocation defect portion. Also, image processing software is used to measure the occupied area ratio. Image-j or image analysis software that has a resolution equal to or greater than that of Image-j is used as the image analysis software.

Also, the percentage of the number of the silicon nitride crystal grains in which the occupied area ratio of the dislocation defect portion is not more than 5% is calculated by imaging 50 silicon nitride crystal grains that have completely visible contours in one 50 μm×50 μm observation region.

Also, it is favorable for the major diameters of the silicon nitride crystal grains to be not more than 25 μm in a 300 μm×300 μm observation region of any cross section of the silicon nitride sintered body. Also, it is favorable for the average of the major diameters of the silicon nitride crystal grains in a 300 μm×300 μm observation region of any cross section of the silicon nitride sintered body to be within the range not less than 1 μm and not more than 10 μm. Also, it is favorable for the surface area of the individual grain boundary phases to be not more than 9 μm2 in a 300 μm×300 μm unit area of any cross section of the silicon nitride sintered body. The surface area of the grain boundary phase means the surface area of the region surrounded with multiple silicon nitride crystal grains.

The major diameters of the silicon nitride crystal grains being not more than 25 μm means that there are no silicon nitride crystal grains that have major diameters greater than 25 μm. That is, this is a state in which there are no large grains greater than 25 μm. As described above, the durability and the electrolytic corrosion resistance are improved by reducing the dislocation defect portions. Because large grains do not exist, partial mechanical strength fluctuation can be suppressed.

Therefore, it is favorable for the major diameters of the silicon nitride crystal grains to be not more than 25 μm, and more favorably not more than 15 μm.

Also, it is favorable for the average of the major diameters of the silicon nitride crystal grains to be within the range not less than 1 μm and not more than 10 μm. When the average of the major diameters is less than 1 μm, there is a possibility that the silicon nitride crystal grains may be too small, and the durability may degrade. Also, when the average of the major diameters is greater than 10 μm, there is a possibility that the gap between the silicon nitride crystal grains may become large, and the strength may decrease.

Also, it is favorable for the surface area of the individual grain boundary phases to be not more than 9 μm2 in a 300 μm×300 μm observation region of any cross section of the silicon nitride sintered body. When the surface area of the grain boundary phase is greater than 9 μm2, there is a possibility that fluctuation of the insulation properties may be caused. The insulation properties are different between the grain boundary phase and the silicon nitride crystal grain. Therefore, when the grain boundary phase is too large, the effect of suppressing the dislocation defect portions of the silicon nitride crystal grains becomes small. Therefore, it is favorable for the surface area of the individual grain boundary phases to be not more than 9 μm2, and more favorably not more than 5 μm2. Most favorably, the surface area of the individual grain boundary phases is not more than 1 μm2.

The major diameters of the silicon nitride crystal grains and the surface area of the grain boundary phase are measured using a SEM photograph. A SEM photograph of any cross section of the silicon nitride substrate is taken. The cross section is made into a polished surface having a surface roughness Ra that is not more than 1 μm. The magnification of the SEM photograph is set to be not less than 1000 times. The recommended magnification of the SEM photograph is 4000 times. When a 300 μm×300 μm region cannot be imaged in one field, a 300 μm×300 μm region may be imaged by dividing into a plurality. When the length in one direction of the cross section is less than 300 μm, a 90000 μm2 observation region is observed by setting the length of the observation region in the one direction to be as long as possible. The major diameters of the silicon nitride crystal grains are measured based on the observation result in the 90000 μm2 observation region.

Figure 2:
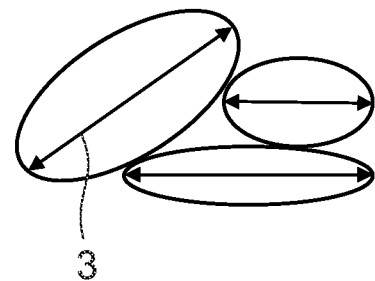
FIG. 2 is a conceptual view illustrating major diameters of the silicon nitride crystal grains.

As shown in FIG. 2, the major diameter is the length of the longest line segment among the line segments obtained by connecting any two points on the outer edge of one silicon nitride crystal grain. In FIG. 2, 3 is the major diameter of the silicon nitride crystal grain 1. Also, the average of the major diameters of the individual silicon nitride crystal grains visible in the SEM photograph of a 300 μm×300 μm observation region is measured. The silicon nitride crystal grains that have contours that are partially cut off at the edge of the SEM photograph and are not completely visible are excluded from the count. The major diameters are determined by using only the silicon nitride crystal grains inside the SEM photograph for which the longest line segment can be observed.

In the SEM photograph, the silicon nitride crystal grain and the grain boundary phase can be discriminated using the contrast difference. The silicon nitride crystal grain appears dark gray, and the grain boundary phase appears light gray. The surface area of the grain boundary phase can be determined by image analysis of the SEM photograph. Specifically, a binarized image is analyzed using image analysis software. In the binary image, the silicon nitride crystal grains are black, and the grain boundary phases are white. A region that is surrounded with not less than three silicon nitride crystal grains is taken to be a grain boundary phase; and the surface area is determined. That is, the surface area is determined by excluding the grain boundary phases existing between two grains of the silicon nitride crystal grains. Also, Image-j or image analysis software that has a resolution equal to or greater than that of Image-j is used as the image analysis software.

By having the configuration described above, a sliding member that has excellent durability and electrolytic corrosion resistance can be provided. Also, for the silicon nitride sintered body, the three-point bending strength can be not less than 900 MPa, and the fracture toughness can be not less than 5.5 MPa·m1/2. That is, the durability and the electrolytic corrosion resistance can be further improved while maintaining the strength as a material. The measurement of the three-point bending strength is performed according to JIS-R-1601. The measurement of the fracture toughness is determined by Niihara's equation according to the IF method of JIS-R-1607. ISO 14704 can be referred to for JIS-R-1601. ISO 15732 can be referred to for JIS-R-1607.

Also, it is favorable for the content of the sintering aid to be not more than 20 mass % when converted into its oxide. The percentage of the grain boundary phase increases when the content of the sintering aid is greater than 20 mass %. When the grain boundary phase increases, there is a possibility that the three-point bending strength or the fracture toughness value may decrease. Also, the effect of reducing the percentage of the silicon nitride crystal grains that include dislocation defect portions decreases.

In other words, it is favorable for the silicon nitride sintered body to include not more than 20 mass % of an added component other than silicon nitride, and for the added component to include not less than three types of elements selected from Y, a lanthanoid element, Al, Mg, Si, Ti, Hf, Mo, and C.

In other words, the silicon nitride sintered body includes not more than 20 mass % of the added component. The added component means a component other than silicon nitride. In the silicon nitride sintered body, the added component other than silicon nitride refers to the sintering aid component. The sintering aid component is included in the grain boundary phase. The grain boundary phase becomes excessive when the added component is excessive and is greater than 20 mass %. The silicon nitride sintered body has a structure in which slender β-silicon nitride crystal grains are complexly entangled. It is undesirable for the sintering aid component to be plentiful because portions are formed that do not have a structure in which the silicon nitride crystal grains are complexly entangled. The three-point bending strength and the fracture toughness value can be increased by including more of a structure that is complexly entangled.

Also, it is favorable for the added component amount to be not less than 3 mass % and not more than 15 mass %. When the added component is less than 3 mass %, there is a possibility that the grain boundary phase may be sparse, and the density of the silicon nitride sintered body may decrease. The grain boundary phase is a component that fills the gap between the silicon nitride crystal grains. Therefore, by regulating the added component to be not less than 3 mass %, the sintered body is easily formed to have a relative density that is not less than 95%. Also, by regulating the added component to be not less than 5 mass %, the sintered body is easily formed to have a relative density that is not less than 98%.

Also, it is favorable for the silicon nitride sintered body to include not less than three elements selected from Y, a lanthanoid element, Al, Mg, Si, Ti, Hf, Mo, or C as the added component. As long as the silicon nitride sintered body includes Y (yttrium), a lanthanoid element, Al (aluminum), Mg (magnesium), Si (silicon), Ti (titanium), Hf (hafnium), Mo (molybdenum), or C (carbon) as an elemental component of an added component, the form is not limited. For example, an oxide (including a hybrid oxide), a nitride (including a hybrid nitride), an oxynitride (including a hybrid oxynitride), a carbide (including a hybrid carbide), etc., are examples of the form. Also, one selected from Yb (ytterbium), Er (erbium), Lu (ruthenium), or Ce (cerium) is favorable as the lanthanoid element.

As described below, when the addition is performed as a sintering aid in the manufacturing processes, an oxide (including a hybrid oxide), a nitride (including a hybrid nitride), or a carbide (a hybrid carbide) are favorable. Yttrium oxide (Y2O3) is favorable when Y is used. Also, one selected from ytterbium oxide (Yb2 O3), erbium oxide (Er2O3), ruthenium oxide (Lu2O3), or cerium oxide (CeO2) is favorable as the lanthanoid element.

Y and a lanthanoid element can promote the formation of slender columnar β-silicon nitride crystal grains.

Aluminum oxide (Al2O3), aluminum nitride (AlN), MgO·Al2O3 spinel, or mullite (Al2O3—SiO2) are favorable when Al is used. Magnesium oxide (MgO), MgO·Al2O3 spinel, or talc (MgO—SiO2) are favorable when Mg is used. Silicon oxide (SiO2) or silicon carbide (SiC) is favorable when Si is used.

Also, Al, Mg, and Si have the effect of lowering the sintering temperature and improving the sinterability.

Titanium oxide (TiO2) or titanium nitride (TiN) is favorable when Ti is used. Hafnium oxide (HfO2) is favorable when Hf is used. Molybdenum oxide (MoO2) or molybdenum carbide (Mo2C) is favorable when Mo is used. It is favorable to add C as silicon carbide (SiC), titanium carbide (TIC), or titanium carbonitride (TiCN).

Ti, Hf, Mo, and C function as components that reinforce the grain boundary phase. Thereby, the silicon nitride sintered body can have a higher strength or a higher toughness.

The grain boundary phase that includes not less than three elements selected from Y, a lanthanoid element, Al, Mg, Si, Ti, Hf, Mo, or C can be configured by adding a combination of two or more types of these added components.

Also, the following combinations are favorable as combinations of sintering aids added in the manufacturing processes.

A first combination includes 2 to 8 mass % of Y2O3, 1 to 6 mass % of Al2O3, 1 to 6 mass % of AlN, and 0.5 to 4 mass % of TiO2. Although Al2O3 and AlN are added, Al is counted as one type of component added to the silicon nitride sintered body. Therefore, according to the first combination, the three types of Y, Al, and Ti are added.

A second combination includes 2 to 8 mass % of Y2O3, 0.1 to 3 mass % of Al2O3, 1 to 6 mass % of AlN, 0.5 to 3 mass % of HfO2, and 0.1 to 3 mass % of Mo2C. According to the second combination, the five types of Y, Al, Hf, Mo, and C are added.

A third combination includes 2 to 8 mass % of Y2O3, 1 to 5 mass % of Al2O3, 1 to 6 mass % of AlN, 0.5 to 3 mass % of HfO2, 0.1 to 3 mass % of Mo2C, and 1 to 6 mass % of SiC. According to the third combination, the six types of Y, Al, Hf, Mo, C, and Si are added.

A fourth combination includes 0.2 to 3 mass % of Y2O3, 0.5 to 5 mass % of MgO·Al2O3 spinel, 2 to 6 mass % of AlN, 0.5 to 3 mass % of HfO2, and 0.1 to 3 mass % of Mo2C. According to the fourth combination, the six types of Y, Mg, Al, Hf, Mo, and C are added.

In the first to fourth combinations, an oxide of a lanthanoid element may be used instead of Y2O3. In the first to fourth combinations, the total of the contents of the sintering aid components is set to be not more than 15 mass %.

The first combination is favorable among the first to fourth combinations described above.

The first combination uses both Al2O3 and AlN as Al. Thereby, a Y—Al—Si—O—N compound is easily formed in the grain boundary phase. The Y-Al-Si—O—N compound is a reactant of Y2O3, Al2O3, AlN, and silicon nitride (Si3N4). That is, the reaction of the sintering aid powder and the silicon nitride powder can be promoted by the sintering process. Also, by adding AlN, the impurity oxygen inside the silicon nitride powder can be utilized to form the Y—Al—Si—O—N compound. The formation of dislocation defect portions in the silicon nitride crystal grains can be suppressed thereby.

Also, TiO2 becomes TIN (titanium nitride) due to the sintering process. The TiN grains function as a component that reinforces the grain boundary phase. Also, abnormal grain growth of the major diameters of the silicon nitride crystal grains can be suppressed. A dense sintered body can be obtained thereby.

Therefore, according to the first combination, the three-point bending strength can be not less than 1000 MPa, and the fracture toughness value can be not less than 6.5 MPa·m1/2.

HfO2 is added in the second to fourth combinations. HfO2 can form a Hf—Al—Y—O-based compound by reacting with Y2O3. This acts as a low melting-point liquid phase and aids the improvement of the sinterability. Therefore, the formation of dislocation defect portions in the silicon nitride crystal grains can be suppressed. Also, Mo2C or SiC functions as a component that reinforces the grain boundary phase.

Thereby, according to the second to fourth combinations, a silicon nitride sintered body that has a three-point bending strength that is not less than 900 MPa and a fracture toughness value that is not less than 5.5 MPa·m1/2 can be obtained.

Compared to the second to fourth combinations, the average value of the three-point bending strength of the first combination is high and is not less than about 100 MPa. According to the first combination, TiO2 changes into TiN (titanium nitride) grains. Therefore, a fine dispersion that is not more than 1 μm also is possible.

TiO2, Mo2C, and SiC are dispersed in the grain boundary phase in a grain form. Because TiO2 is accompanied by a change into TIN (titanium nitride) grains and is therefore easily dispersed as fine grains inside the grain boundary phase inside the silicon nitride sintered body. Thereby, the grain boundary phase can be reinforced in addition to reducing the size of the grain boundary phase. According to the first combination, the surface area of the grain boundary phase can be not more than 5 μm2, and even not more than 1 μm2.

A silicon nitride sintered body that has the target strength and/or fracture toughness value can be used according to the environment of use of the sliding member. Also, it is favorable for the surface roughness Ra of the sliding surface of the silicon nitride sintered body to be not more than 1 μm.

The sliding member that includes a silicon nitride sintered body such as that described above has excellent durability. Also, the sliding member has electrolytic corrosion resistance as well. A bearing member, a roll member, a compressor member, a pump member, an engine member, a friction stir welding apparatus member, etc., are examples of the sliding member.

A bearing includes a combination of a rolling body and a bearing ring. The rolling body is spherical or roller-shaped. Here, the rolling body is called a bearing ball. The spherical shape is a ball; and the roller shape is a circular column. Also, a bearing that uses a spherical rolling body is called a ball bearing. A bearing that uses a roller-shaped rolling body is called a roller bearing. A needle bearing, a tapered roller bearing, and a spherical roller bearing also are included in roller bearings. Also, the bearing ring includes an outer ring and an inner ring.

Also, a rolling roller, a feed part roller of an electronic device, etc., are examples of roll members. A vane or the like is an example of a compressor member or a pump member. Here, a compressor is differentiated as increasing the pressure; and a pump is differentiated as reducing the pressure. Also, a cam roller, a cylinder, a piston, a check ball, etc., are examples of engine members. Also, a friction stir welding apparatus tool member or the like is an example of a friction stir welding apparatus member.

The sliding member according to the embodiment has excellent durability and therefore is applicable to diverse fields such as those described above. For the sliding member of the fields described above, at least one of the sliding member or the mating member slides with respect to the other. For example, in a bearing, the position of the rolling body in the bearing does not change. However, a portion of the surface of the rolling body contacts a portion of the surface of the mating member; and the portion of the surface of the rolling body slides with respect to the mating member. The sliding member according to the embodiment has excellent durability due to few dislocation defect portions. In particular, the sliding member according to the embodiment is suited to a sliding member that has surface sliding. Also, the sliding member is favorably used in an environment of use in which the sliding conditions change. A bearing that is mounted in an inverter-driven motor is an example of such a sliding member.

A method for measuring the dynamic rated load and the rated life of the roller bearing is established in JIS-B-1518. The rated load is used in the calculation formula of the rated life of JIS-B-1518. Thus, the life of a general bearing has been measured using the load and the rotational speed. Therefore, it cannot be said that the investigation is necessarily sufficient for an environment of use in which the rotational speed changes. ISO 281 can be referred to for JIS-B-1518.

Here, the torque of an inverter-driven motor will be described. The synchronous speed of the motor is taken as Ns(r/min); the rated rotational speed (r/min) of the motor is taken as N; slip (%) is taken as s; the frequency (Hz) of the power supply is taken as f; and the number of poles of the motor is taken as p. The synchronous speed Ns of the motor is represented by Ns=(2f/p)×60. Torque is generated by the rotor (the rotor) at a rotational speed that slightly slips from the synchronous speed Ns. A load that corresponds to the torque is applied to the bearing.

The rated rotational speed N (r/min) of the motor is represented by N=Ns(1−s)=(120f/p) (1−s). The slip s (%) is represented by s=((Ns-N)/Ns)×100. It can be seen from these formulas that to change the rotational speed of an inverter-driven motor, it is effective to change the frequency of the power supply. The unit r/min is rpm.

A method that measures the sliding noise is effective for measuring the durability of a bearing in an environment of use in which the sliding conditions change. A method for measuring the noise level of a roller bearing is established in JIS-B-1548. As described above, the torque changes in a motor that is inverter-driven. The change of the torque causes a change of the stress on the bearing ball surface. The sliding noise changes when the bearing ball surface is damaged. Therefore, the change of the sliding noise is effective as a method for measuring the durability of the bearing ball.

The sliding member according to the embodiment includes few dislocation defect portions. Therefore, even when the sliding member according to the embodiment is used in applications in which the sliding conditions change, the occurrence of the damage or electrolytic corrosion of the sliding member can be suppressed, and the sliding characteristics are excellent. For example, the motor can be inverter-driven while changing the rotational speed of the motor within a range of about 50 to 15000 rpm. The sliding member according to the embodiment has excellent durability even for conditions of use in which the change of the rotational speed is not less than 1000 rpm.

A method for manufacturing the sliding member according to the embodiment will now be described. As long as the sliding member has the configuration described above, the method for manufacturing the sliding member is not particularly limited. Here, the following example is an example of a method for with a high yield obtaining the sliding member according to the embodiment.

First, a raw material powder is prepared. The raw material powder includes a silicon nitride powder and a sintering aid powder. The sintering aid described above is favorably used. It is favorable for the sintering aid to satisfy one of the first combination to the fourth combination.

Also, the simple metals of the sintering aid are set so that the total amount is not more than 20 mass % when the simple metals are converted into their oxides. It is favorable for the lower limit of the added amount of the sintering aid to be not less than 2 mass %.

For the silicon nitride powder, it is favorable for the gelatinization ratio to be not less than 80 mass %, the average particle size to be 0.4 to 2.5 µm, and the impurity oxygen content to be not more than 2 mass %. It is favorable for the impurity oxygen content to be not more than 2 mass %, and more favorably not more than 1.0 mass %. More favorably, the impurity oxygen content is 0.1 to 0.8 mass %. When the impurity oxygen content is high and is greater than 2 mass %, there is a possibility that a reaction may occur between the impurity oxygen and the sintering aid; and the grain boundary phase may be formed more than necessary. Also, it is favorable for the average particle size D50 of the sintering aid powder to be not more than 1.0 µm, and more favorably not more than 0.4 µm. In the grain growth process of the silicon nitride crystal grain, it is effective to form a state at the surface of the silicon nitride crystal grain in which the sintering aid component is easily coordinated. To this end, a fine powder form of the sintering aid powder is favorable.

A raw material mixture is prepared by mixing the raw material powder described above and by adding a binder. The raw material powder is a mixed powder of the silicon nitride powder and the sintering aid powder. The raw material mixture in which the binder is added to the mixed powder is a slurry. To control the grain growth of the silicon nitride crystal grain in the sintering process, it is favorable for the mixed powder to be uniformly mixed. In the mixing process, pulverizing and mixing is performed using a pulverizer such as a ball mill, etc. If the pulverizing stress is too large at this time, dislocation defect portions are formed in the silicon nitride powder; and dislocation defect portions more easily remain in the silicon nitride grains after sintering. Therefore, in the mixing process, it is favorable to pulverize with soft stress so that dislocation defect portions are not formed in the silicon nitride powder, and the average particle size D50 becomes not more than 1 µm. A method that is not less than 20 hours so that the average particle size D50 becomes not more than 1 µm is an example of the mixing process under soft stress. Also, slowing the rotational speed of the pulverizer such as the ball mill or the like, reducing the media amount, using a light media, etc., are examples of performing the mixing process under soft stress. Media is fed into the pulverizer together with the mixed powder. The mixed powder can be efficiently pulverized by using the media. Therefore, the media is also called grinding media. By pulverizing with soft stress, both the pulverizing efficiency and the defect suppression can be realized.

It is favorable for the rotational speed of the pulverizer to be not less than 20% and not more than 40% of the critical rotational speed. For example, the critical rotational speed of a ball mill pulverizer is represented by the theoretical formula $Nc=42.3 \cdot D^{-1/2}$. Nc is the critical rotational speed (rpm); and D is the pot inner diameter (m). This theoretical formula is a formula in which the critical state is defined as the state in which the gravitational force and the centrifugal force are balanced for a ball at the apex of the mill cylinder.

The optimal rotational speed of a general ball mill is said to be about 55 to 85% of the critical rotational speed. By setting the rotational speed to be not more than 40% of the critical rotational speed, the mixing process can be performed under soft stress. Also, although the stress is soft when the rotational speed is less than 20% of the critical rotational speed as well, the mixing time becomes too long, and the suitability for mass production decreases. Therefore, it is favorable for the rotational speed of the pulverizer to be not more than 40% of the critical rotational speed, and particularly not less than 20% and not more than 40%.

Also, it is favorable for the media amount to be not more than 10 mass % when the mass of the mixed powder of the silicon nitride powder and the sintering aid powder is taken to be 100 mass %. When light media is used, it is favorable for the media to have a specific gravity that is not more than 4 times the specific gravity of the slurry. Soft stress can be realized by reducing the media amount and/or reducing the specific gravity.

"Perform for not less than 20 hours", "set to not more than 40% of the critical rotational speed", "reduce the media amount", and "use media having a small specific gravity" described above may be performed in combination.

Then, a forming process of forming the raw material mixture is performed. Die pressing, cold isostatic pressing (CIP), sheet forming, etc., are applicable as the forming technique of the raw material mixture. A doctor blade method or roll forming are examples of sheet forming. These forming methods may be combined. The raw material mixture may be mixed with a solvent such as toluene, ethanol, butanol, etc., as necessary. The raw material mixture may be mixed with an organic binder as necessary. Butyl methacrylate, polyvinyl butyral, polymethyl methacrylate, etc., are examples of the organic binder. Also, it is favorable for the added amount of the organic binder to be 3 to 17 mass % when the raw material mixture (the total amount of the silicon nitride powder and the sintering aid powder) is taken to be 100 mass %.

When the added amount of the organic binder is less than 3 mass %, the binder amount is too low, and it is difficult to maintain the shape of the formed body. Also, when the added amount of the organic binder is greater than 17 mass %, the voids in the formed body after the degreasing process (the formed body after the degreasing treatment) become large; and a dense sintered body is not obtained.

Then, a degreasing process of the formed body is performed. In the degreasing process, heating is performed for 1 to 4 hours at a temperature of 500 to 800° C. in a nonoxidizing atmosphere. The greater part of the organic binder that is pre-added is degreased. A nitrogen gas atmosphere, an argon gas atmosphere, etc., are examples of the nonoxidizing atmosphere. If necessary, an organic substance amount that remains in the degreased body may be controlled by processing in an oxidation atmosphere such as an ambient-air atmosphere, etc.

Then, the degreased body (the formed body after the degreasing treatment) is placed inside a firing container; and a sintering process is performed in a nonoxidizing atmosphere inside a furnace. It is favorable for the temperature of the sintering process to be within the range not less than 1650° C. and not more than 2000° C. It is favorable for the nonoxidizing atmosphere to be a nitrogen gas atmosphere or a reducing atmosphere including nitrogen gas. Also, it is favorable for the pressure inside the furnace to be a pressurized atmosphere.

When the degreased body is sintered with the sintering temperature in a low-temperature state that is less than 1650° C., the grain growth of the silicon nitride crystal grain is insufficient, and a dense sintered body is difficult to obtain. On the other hand, when the degreased body is sintered with a sintering temperature that is a higher temperature than 2000° C., there is a risk that Si and $N_2$ may decompose when the furnace atmosphere pressure is low. Therefore, it is favorable to control the sintering temperature to be in the range described above. Also, it is favorable for the sintering time to be within the range not less than 3 hours and not more than 12 hours.

In the sintering process, it is favorable for the heating rate in the range not less than 1300° C. and not more than 1500° C. to be not more than 50° C./h. In this temperature range, a liquid phase that is mainly the sintering aid is formed. The diffusion to the silicon nitride crystal grain surface can be promoted by controlling the heating rate.

It is favorable for the heating rate from 1500° C. to the sintering temperature to be not more than 50° C./h. By setting the heating rate to be not more than 50° C./h, uniform grain growth can be promoted; the formation of large grains can be suppressed; and the formation of dislocation defect portions in the silicon nitride crystal grains can be suppressed.

Also, it is favorable for the change amount of the pressure to be not more than 0.3 MPa. By suppressing the change amount of the pressure as well, the formation of dislocation defect portions in the silicon nitride crystal grains can be suppressed. The change of the pressure affects the grain growth of the silicon nitride crystal grain. Even when the sintering process is performed at atmospheric pressure or by pressurizing, it is favorable for the change amount of the pressure to be not more than 0.3 MPa, and more favorably not more than 0.1 MPa.

To control the change amount of the pressure, it is effective to control the gas pressure in the sintering atmosphere. Gas is easily generated in the sintering process of the silicon nitride sintered body. In the sintering process, impurity oxygen that is inside the binder, sintering aid, and silicon nitride powder inside the formed body, etc., become gas components. The pressure of the sintering atmosphere changes due to the generated gas components. That is, in pressureless sintering in which pressure is not particularly applied, the pressure of the sintering atmosphere is changed by the generated gas components. Therefore, it is effective to control so that the generated gas components are removed, etc., so that the atmosphere pressure in the sintering process does not change.

Thus, the abnormal grain growth of the silicon nitride crystal grain can be suppressed by the control of the heating rate or the suppression of the pressure change.

Thereby, the maximum value of the major diameters of the silicon nitride crystal grains in a 300 μm×300 μm observation region of any cross section of the silicon nitride sintered body can be controlled to be not more than 25 μm. Also, the average of the major diameters of the silicon nitride crystal grains in a 300 μm×300 μm observation region of any cross section of the silicon nitride sintered body can be controlled to be within the range not less than 1 μm and not more than 10 μm. Also, abnormal grain growth can be suppressed; therefore, the surface area of the individual grain boundary phases in a 300 μm×300 μm observation region of any cross section of the silicon nitride sintered body can be controlled to be not more than 9 μm2, and even not more than 5 μm2.

Also, it is favorable to perform HIP (hot isostatic press) processing of the sintered body after the sintering process described above. Here, the process of sintering the degreased body described above is called a first sintering process; and the process of HIP processing of the sintered body is called a second sintering process. It is favorable for the HIP processing to be performed at a temperature that is not less than 1600° C. and not more than 1900° C. and at a pressure within the range not less than 80 MPa and not more than 200 MPa. The pores inside the sintered body can be reduced by the HIP processing. A dense sintered body can be obtained thereby. When the pressure is less than 80 MPa, the effect of applying the pressure is insufficient. Also, when the pressure is high and is greater than 200 MPa, there is a possibility that the load on the manufacturing apparatus may become high.

It is favorable for the heat treatment temperature of the second sintering process to be less than the heat treatment temperature of the first sintering process. By lowering the heat treatment temperature of the second sintering process, the grain growth of the silicon nitride crystal grain can be suppressed.

Also, according to the manufacturing method described above, the formation of the dislocation defect portions in the first sintering process is suppressed. Therefore, even when HIP processing that applies pressure is performed, the increase of the dislocation defect portions can be suppressed. In other words, it is important not to form dislocation defect portions in the silicon nitride crystal grains in the first sintering process.

Also, the silicon nitride sintered body that is obtained is processed into a sliding member. Surface polishing, cutting, machining, electric discharge machining, etc., are examples of the processing. In the surface polishing, the location that becomes the sliding surface of the silicon nitride sintered body is processed so that the surface roughness Ra is not more than 1 μm. The durability of the sliding member is improved by setting the surface roughness Ra of the sliding surface to be not more than 1 μm, and more favorably not more than 0.2 μm. Also, the tendency to damage the mating member can be reduced, which also improves the durability.

Figure 3:
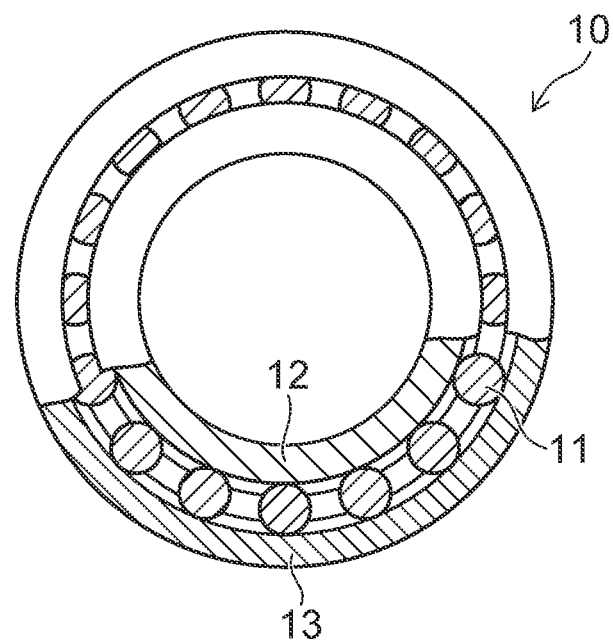
FIG. 3 is a conceptual view showing an example of a bearing.

FIG. 3 shows an example of a bearing. In FIG. 3, 10 is the bearing; 11 is a bearing ball; 12 is an inner ring; and 13 is an outer ring. The bearing 10 has a structure in which the bearing ball 11 is disposed between the inner ring 12 and the outer ring 13.

For example, the sliding member according to the embodiment is included in the bearing ball (the rolling body) 11. The bearing ring (the inner ring 12 and the outer ring 13) include bearing steel SUJ2. The bearing 10 includes these members. The entire spherical surface of the bearing ball is the sliding surface. Therefore, the entire spherical surface is polished. The tendency to damage the bearing ring can be reduced by reducing the surface roughness Ra of the bearing ball. That is, the wearing away of the sliding surface of the bearing ring as the bearing ball slides can be suppressed. Therefore, the durability of the entire bearing can be improved.

Figure 4:
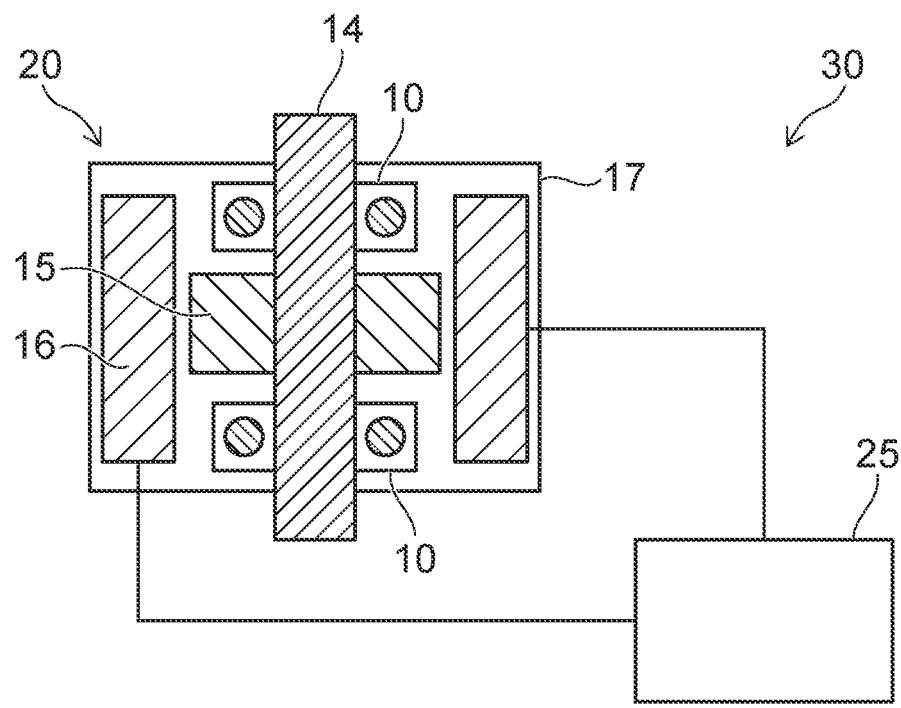
FIG. 4 is a conceptual view showing an example of a motor and a drive device that includes the motor.

FIG. 4 shows a motor that uses the bearing, and a drive device that uses the motor. In FIG. 4, 20 is a motor; 10 is the bearing; 14 is a rotation axis; 15 is a rotor; 16 is a stator; and 17 is a case. Also, 30 is the drive device; and 25 is a controller. The motor 20 according to the embodiment includes the bearing 10 according to the embodiment. The drive device 30 according to the embodiment includes the motor 20 and the controller 25 according to the embodiment.

The bearings are located around one end and around the other end of the rotation axis. The inner rings of the bearings rotate as the rotation axis rotates; and the inner rings slide with respect to the surfaces of the bearing balls. Also, the bearing balls rotate, and the surfaces of the bearing balls slide with respect to the outer rings. The rotor also is located around the rotation axis. The rotor is positioned between the bearings. The stator is located around the rotor. The bearings, a portion of the rotation axis, the rotor, and the stator are housed inside the case. The stator is fixed with respect to the case. The rotor is fixed with respect to the rotation axis; and the rotation axis and the rotor rotate at the inner side of the stator.

The controller is electrically connected with the stator. The controller supplies an alternating current to the stator. The rotation axis of the motor is inverter-driven thereby. Also, the rotational speed of the motor can be changed by changing the frequency of the alternating current.

The motor and the drive device according to the embodiment include a bearing in which the durability is improved. The life of the motor and the drive device can be extended thereby, and the reliability can be increased.

Also, the rotational speed of the motor corresponds to the rotational speed of the bearings, the rotation axis, and the rotor. By applying the sliding member according to the embodiment to the bearing balls, the reliability of the motor and the drive device in which the rotational speed of the bearings is not less than 50 rpm can be increased. The reliability of the motor and the drive device can be increased even when the motor and the drive device are configured so that the change of the rotational speed of the bearings is not less than 1000 rpm.

EXAMPLE

Examples 1 to 7 and Comparative Example 1

A mixed raw material powder was prepared in which a silicon nitride powder and a sintering aid powder were mixed. Then, mixed raw material powders 1 to 6 were prepared by pulverizing and mixing the mixed raw material powder. The pulverizing and mixing was performed using a ball mill.

For the mixed raw material powders 1 to 5, the pulverizing process was performed for not less than 20 hours until the average particle size D50 became not more than 1 μm. Also, for the mixed raw material powder 6, the pulverizing process was performed in a short period of time for 10 hours.

Also, the first combination was used for the mixed raw material powders 1 to 2 and the mixed raw material powder 6. The second combination was used for the mixed raw material powder 3. The third combination was used for the mixed raw material powder 4. The fourth combination was used for the mixed raw material powder 5. The results are shown in Table 1.

TABLE 1

| | Mixing ratio (wt %) | Average particle size $D_{50}$ before pulverizing and mixing (μm) | Average particle size $D_{50}$ after pulverizing and mixing (μm) | Pulverizing time (h) |
|---|---|---|---|---|
| Mixed raw material powder 1 | Si3N4(87.4) Y2O3(5) Al2O3 (4), AlN(3), TiO2(0.6) | 1.2 | 0.9 | 40 |
| Mixed raw material powder 2 | Si3N4(88.2) Y2O3(4) Al2O3 (3), AlN(4), TiO2(0.8) | 1.4 | 1.0 | 30 |
| Mixed raw material powder 3 | SiN4(89) Y2O3(4) Al2O3 (1), AlN(3), HfO2 (2), Mo2C(1) | 1.5 | 1.0 | 35 |
| Mixed raw material powder 4 | Si3N4(88) Y2O3(5) Al2O3 (2), AlN(2), HfO2 (0.5), Mo2C(1), SiC(1.5) | 1.4 | 0.9 | 35 |
| Mixed raw material powder 5 | Si3N4(91) Y2O3(1) MgO · Al2O3 Spinel(3), AlN(3), HfO2 (1), Mo2C(1) | 1.5 | 1.0 | 35 |
| Mixed raw material powder 6 | Si3N4(87.4) Y2O3(5) Al2O3 (4), AlN(3), TIO2(0.6) | 1,3 | 1.0 | 10 |

Then, mixed raw material pastes were prepared by adding a binder that was 5 to 10 wt % to the mixed raw material powders. Die molding was performed using the mixed raw material pastes. Degreased bodies were prepared by performing a degreasing process of the formed bodies at 500 to 800° C. for 1 to 4 hours.

Then, the first sintering process shown in Table 2 was performed in a nitrogen atmosphere. The pressure of 0.1 MPa indicates atmospheric pressure.

of a silicon nitride sintered body having a diameter of 9.525 mm (3/8 inch) was made, and the wear resistance was tested.

Then, the dislocation defect portions, the major diameters of the silicon nitride crystal grains, the surface area of the grain boundary phase, the three-point bending strength, and the fracture toughness value were measured for the examples and the comparative example.

In the measurement of the dislocation defect portions, a surface made by processing an arbitrary cross section by ion

TABLE 2

|  |  | Heat treatment process | | First sintering process | |
|---|---|---|---|---|---|
|  | Mixed raw material powder | Heating rate from 1300° C. to 1500° C. (° C./h) | Heating rate from 1500° C. to sintering temperature (° C./h) | First sintering process temperature (° C.) × time (h) × pressure (MPa) | Pressure change amount from heat treatment process to sintering process (MPa) |
| Example 1 | Mixed raw material powder 1 | 50 | 55 | 1730 × 5 × 0.3 | 0 |
| Example 2 | Mixed raw material powder 1 | 30 | 40 | 1800 × 4 × 0.5 | 0.2 |
| Example 3 | Mixed raw material powder 2 | 40 | 40 | 1700 × 8 × 0.8 | 0 |
| Example 4 | Mixed raw material powder 2 | 30 | 20 | 1750 × 6 × 0.4 | 0.1 |
| Example 5 | Mixed raw material powder 3 | 20 | 20 | 1850 × 4 × 0.2 | 0.1 |
| Example 6 | Mixed raw material powder 4 | 50 | 50 | 1780 × 10 × 0.1 | 0 |
| Example 7 | Mixed raw material powder 5 | 50 | 50 | 1780 × 6 × 0.1 | 0 |
| Comparative example 1 | Mxed raw material powder 6 | 100 | 100 | 1750 × 10 × 0.2 | 0.4 |

Also, the sintered body that was obtained was cooled to room temperature after the first sintering process ended. Subsequently, the second sintering process was performed. The second sintering process was HIP processing. The HIP processing conditions were as shown in Table 3.

TABLE 3

|  | Second sintering process (HIP processing) Temperature (° C.) × time (h) × pressure (MPa) |
|---|---|
| Example 1 | 1700 × 3 × 100 |
| Example 2 | 1700 × 4 × 150 |
| Example 3 | 1600 × 4 × 200 |
| Example 4 | 1650 × 4 × 100 |
| Example 5 | 1700 × 2 × 150 |
| Example 6 | 1680 × 3 × 200 |
| Example 7 | 1650 × 5 × 100 |
| Comparative example 1 | 1700 × 5 × 100 |

Surface polishing of the obtained silicon nitride sintered body was performed so that the surface roughness Ra became not more than 0.01 µm. Also, the silicon nitride sintered body was made to the sample size established by JIS; and the three-point bending strength and the fracture toughness value were measured. Also, a bearing ball made milling so that the surface roughness Ra was not more than 1 µm was used as the evaluation surface. The evaluation surface was observed by TEM. In TEM, a 50 µm×50 µm region of the evaluation surface was observed and imaged. Also, another region separated from one observation region by 1000 µm also was observed and imaged. In other words, the dislocation defect portions were measured in regions in a total of two locations. The magnification of the TEM photograph was set to 10000 times, and the bright-field image and the dark-field image were imaged. The regions that appeared to be white in the dark-field image were taken to be dislocation defect portions. The existence or absence of dislocation defect portions and the occupied area ratio inside one silicon nitride crystal grain were determined by comparing the bright-field image and the dark-field image. The silicon nitride crystal grains that were partially cut off at the edge of the TEM photograph (the silicon nitride crystal grains not having completely visible contours) were excluded from the count. Also, the occupied area ratio of the dislocation defect portion was measured by using image processing software to binarize the dark-field image and by determining the area ratio of the white regions and the black regions.

Also, the elements of the kernels of the dislocation defect portions were analyzed. EDX was used to analyze the dislocation defect portions. Thereby, it was measured, for the elements other than silicon, oxygen, and nitrogen in the dislocation defect portion, whether or not an aggregate was 1 µm2 or more, or whether or not 10 mol % or more was detected.

Also, a SEM observation of an arbitrary cross section was performed in the measurement of the major diameters of the silicon nitride crystal grains. The magnification of the SEM photograph was set to 3000 times, and a 300 µm×300 µm region was observed and imaged. The distance between two points on the longest outer edge was used as the major diameter of one silicon nitride crystal grain visible in the SEM photograph. In the SEM photograph, the average of the major diameters of the silicon nitride crystal grains visible in a 300 µm×300 µm observation region was determined. The longest major diameter was determined as the maximum value of the major diameters. Also, the largest surface area of the grain boundary phases visible in the SEM photograph was determined.

The three-point bending strength was performed according to JIS-R-1601. The fracture toughness was performed according to the IF method of JIS-R-1607, and was determined using Niihara's equation.

The results are shown in Table 4 and Table 5.

excellent values were obtained for the three-point bending strength and the fracture toughness value as well.

Then, a durability test as a bearing ball was performed. Sixteen bearing balls were used as one set, and were assembled in the bearing ring (the inner ring and the outer ring) to make a bearing. The durability and the electrolytic corrosion resistance were checked for each bearing.

In the durability test, continuous driving of the bearing was performed the conditions of "1 hour at 50 rpm"→ "increase from 50 rpm to 1000 rpm over 1 hour" →"1 hour at 1000 rpm"→"increase 1000 rpm to 10000 rpm over 1 hour"→"1 hour at 10000 rpm"→ "reduce 10000 rpm to 50 rpm over 1 hour" as one set. The change rate of the sliding noise for a continuous driving of 400 hours or 800 hours was determined with respect to the sliding noise for a continuous driving of 100 hours.

The increase of the sliding noise that was not more than 10% was optimal (◎); greater than 10% and less than 20% was good (O); and greater than 20% was defective (x). The test checked the change of the sliding state due to damage of the bearing ball or seizure of the bearing ring. The mea

TABLE 4

| | Dislocation defect portion | | Dislocation defect portion kernel | |
|---|---|---|---|---|
| | Percentage of number of silicon nitride crystal grains including dislocation defect portions(%) | Percentage of number of silicon nitride crystal grains having occupied area ratio not more than 5% (%) | (element other than silicon, oxygen, and nitrogen) | |
| | | | Existence of aggregate of 1 µm$^2$ or more | 10 mol % or more detected |
| Example 1 | 1 | 100 | No | No |
| Example 2 | 0 | — | No | No |
| Example 3 | 0 | — | No | No |
| Example 4 | 0 | — | No | No |
| Example 5 | 2 | 100 | No | No |
| Example 6 | 2 | 100 | No | No |
| Example 7 | 3 | 100 | No | No |
| Comparative example 1 | 18 | 100 | No | No |

TABLE 5

| | Silicon nitride crystal grain major diameter | | Maximum surface area of grain boundary phase (µm$^2$) | Three-point bending strength (MPa) | Fracture toughness value (MPa·m$^{1/2}$) |
|---|---|---|---|---|---|
| | Maximum value (µm) | Average value (µm) | | | |
| Example 1 | 6 | 3 | 0.6 | 1200 | 7.8 |
| Example 2 | 7 | 4 | 0.7 | 1150 | 7.5 |
| Example 3 | 8 | 5 | 0.9 | 1120 | 7.4 |
| Example 4 | 10 | 5 | 1.0 | 1100 | 7.3 |
| Example 5 | 15 | 8 | 1.8 | 1100 | 7.4 |
| Example 6 | 17 | 8 | 2.8 | 920 | 6.5 |
| Example 7 | 19 | 9 | 3.2 | 900 | 6.5 |
| Comparative example 1 | 25 | 15 | 4.2 | 1100 | 7.0 |

It can be seen from the tables that the percentage of the dislocation defect portions was small in the examples. Also, surement of the sliding noise was performed according to JIS-B-1548.

Also, for the electrolytic corrosion resistance, the existence or absence of electrolytic corrosion after 800 hours elapsed was checked. The results are shown in Table 6.

TABLE 6

| | Durability test (sliding noise change rate) | | Electrolytic corrosion resistance |
|---|---|---|---|
| | After 400 hours elapsed | After 800 hours elapsed | Existence of electrolytic corrosion after 800 hours elapsed |
| Example 1 | ◎ | ◎ | No |
| Example 2 | ◎ | ◎ | No |
| Example 3 | ◎ | ◎ | No |
| Example 4 | ◎ | ◎ | No |
| Example 5 | ◎ | ○ | No |
| Example 6 | ◎ | ○ | No |
| Example 7 | ◎ | ○ | No |
| Comparative exemple 1 | ◎ | × | Yes |

Thus, the bearing ball according to the example has excellent durability and electrolytic corrosion resistance. In particular, both the durability and the electrolytic corrosion resistance were excellent for the examples 1 to 4 in which the sintering aid was the first combination.

Conversely, for the comparative example 1, the durability test was equivalent at about 400 hours, but degraded when 800 hours elapsed. Also, electrolytic corrosion occurred. It was found that the sliding characteristics can be affected in an environment of use in which the rotational speed changes by the existence of a prescribed amount of dislocation defect portions.

While certain embodiments of the invention are illustrated hereinabove, these embodiments have been presented by way of example only, and are not intended to limit the scope of the inventions. These novel embodiments may be embodied in a variety of other forms; furthermore, various omissions, substitutions, modifications, etc., may be made without departing from the spirit of the inventions. These embodiments and their modifications are within the scope and spirit of the invention and are within the scope of the inventions described in the claims and their equivalents. Also, the embodiments described above can be performed in combination with each other.

What is claimed is:

1. A sliding member, comprising:
a silicon nitride sintered body including silicon nitride crystal grains and a grain boundary phase among the silicon nitride crystal grains,
a percentage of a number of the silicon nitride crystal grains including dislocation defect portions inside the silicon nitride crystal grains among any 50 of the silicon nitride crystal grains having completely visible contours in a 50 μm×50 μm observation region of any cross section or surface of the silicon nitride sintered body being not less than 0% and not more than 10%,
wherein a percentage of a number of the silicon nitride crystal grains having an occupied area ratio of the dislocation defect portion that is not more than 5% among the number of the silicon nitride crystal grains including dislocation defect portions is not less than 70%.

2. The sliding member according to claim 1, wherein the percentage is not less than 0% and not more than 3%.

3. The sliding member according to claim 1, wherein no aggregate of a component other than silicon, oxygen, and nitrogen is 1 μm2 or more in the dislocation defect portion.

4. The sliding member according to claim 1, wherein no component other than silicon, oxygen, and nitrogen is detected to be 10 mol % or more in the dislocation defect portion.

5. The sliding member according to claim 1, wherein a maximum value of major diameters of the silicon nitride crystal grains in a 300 μm×300 μm observation region of any cross section of the silicon nitride sintered body is not more than 25 μm.

6. The sliding member according to claim 1, wherein an average of major diameters of the silicon nitride crystal grains in a 300 μm×300 μm observation region of any cross section of the silicon nitride sintered body is within a range not less than 1 μm and not more than 10 μm.

7. The sliding member according to claim 1, wherein a surface area of each of the grain boundary phases in a 300 μm×300 μm observation region of any cross section of the silicon nitride sintered body is not more than 9 μm$^2$.

8. The sliding member according to claim 1, wherein the sliding member is a bearing ball.

9. The sliding member according to claim 1, wherein the percentage is not less than 0% and not more than 3%, and
no aggregate of a component other than silicon, oxygen, and nitrogen is 1 μm$^2$ or more in the dislocation defect portion.

10. The sliding member according to claim 9, wherein an average of major diameters of the silicon nitride crystal grains in a 300 μm×300 μm observation region of any cross section of the silicon nitride sintered body is within a range not less than 1 μm and not more than 10 μm, and
a surface area of each of the grain boundary phases in a 300 μm×300 μm observation region of any cross section of the silicon nitride sintered body is not more than 9 μm$^2$.

11. The sliding member according to claim 1, wherein an average of major diameters of the silicon nitride crystal grains in a 300 μm×300 μm observation region of any cross section of the silicon nitride sintered body is within a range not less than 1 μm and not more than 10 μm, and
a surface area of each of the grain boundary phases in a 300 μm×300 μm observation region of any cross section of the silicon nitride sintered body is not more than 9 μm$^2$.

12. A bearing, comprising:
the sliding member according to claim 1.

13. A motor, comprising:
the bearing according to claim 12.

14. The motor according to claim 13, wherein the motor is configured to cause a rotational speed of the bearing to be not less than 50 rpm.

15. The motor according to claim 13, wherein the motor is configured to cause a rotational speed of the bearing to change not less than 1000 rpm.

16. A drive device, comprising:
the motor according to claim 13; and
a controller performing at least inverter driving of the motor.

* * * * *